though, the catalyst may be placed in tubes surrounded by a cooling medium such as a molten salt mixture.

3,398,199
PROCESS AND CATALYST FOR THE OXIDATION OF OLEFINS
Robert A. Walde, Emmaus, Pa., assignor to Air Products and Chemicals, Inc., Philadelphia, Pa., a corporation of Delaware
No Drawing. Filed Feb. 28, 1964, Ser. No. 348,268
5 Claims. (Cl. 260—604)

ABSTRACT OF THE DISCLOSURE

Catalytic oxidation of olefins, particularly of propylene or isobutylene, is effected at 200 to 500° C. over silica-supported copper boride.

---

The present invention relates to the catalytic oxidation of olefins employing a novel metal boride catalyst. More particularly, this invention involves a process for the production of unsaturated aldehydes and ketones employing copper boride catalyst which has special application to the production of acrolein and methacrolein from propylene and isobutylene, respectively.

In accordance with the present invention, a substantial amount of an olefin is oxidized to an oxygenated hydrocarbon containing the same or a lesser number of carbon atoms per molecule by contacting the vapor phase of a gaseous mixture comprising olefin and oxygen with copper boride catalyst at elevated temperatures.

By the term "olefin" as used herein both open-chain as well as cyclic olefins are contemplated. Among the olefinic compounds which may be utilized, are compounds such as propylene, butene-1, butene-2, isobutylene, pentene-1, pentene-2, 3-methylbutene-1, 2-methyl-butene-2, hexene-1, hexene - 2, 4 - methylpentene-1, 3,3-dimethyl-butene-1, 4-methyl-pentene-2, octene-1, cyclopentene, cyclohexene, 3-methyl-cyclohexene, etc. This invention is directed particularly to the oxidation of lower alkenes having 3 to 8 carbon atoms but higher alkenes may be utilized with efficacy. These compounds and their various homologs may be substituted in the nucleus and/or in the substituents in various degrees by straight chain alicyclic or heterocyclic radicals. The process of the invention is applicable to individual olefins as well as to mixtures of olefins and also to mixtures of olefins with the corresponding alkane or other saturated organic compounds. For example, a propylene-propane mixture may constitute the feed.

The process is particularly adapted to the conversion of propylene to acrolein, isobutylene to methacrolein, pentene - 2 to ethylvinylketone, 2 - methyl-butene-2 to methyl-isopropenyl ketone, cyclopentene to cyclopentenone-2, and the like.

The catalyst, employed in the instant invention, must contain copper boride. While the catalyst may be employed without any support, it is desirable to combine it with a carrier material. A preferred support is silica and when this support is employed the catalyst contains between about 75 to 99% by weight of silica. It is to be understood, however, that support materials other than silica, such as silicon carbide, alumina and silica-alumina, may be employed as the carrier material although they do not necessarily provide equivalent results.

A typical supported copper boride catalyst is prepared by first depositing a copper salt such as copper sulfate, copper acetate or cupric chloride on a suitable high surface area substrate which may be in the form of pellets, spheres or tablets. The copper salt is added as a solution of a volume just sufficient to wet the substrate. After removing the solvent, e.g., by evaporation, the dry substrate plus copper salt is then reacted with a solution of an alkali metal borohydride. Mild agitation during the course of operation is beneficial since it insures homogenous contact of the reactants.

Both aqueous and non-aqueous solvents can be utilized in the catalyst preparation. In particular, water dimethylformamide, ethylene diamine, n-butyl amine, diethylene glycol, etc. can be used.

It is desirable in some instances, to add a minor amount of promoter to the copper boride catalyst. For example, tungsten, bismuth, chromium and molybdenum may be added in concentrations ranging from 0.1 to 20% of the active ingredients to promote catalyst activity.

In some cases, it may be desirable to heat treat the catalyst after preparation for the purpose of modifying the surface area or for the purpose of driving off those volatile ingredients which are included in the catalyst during preparation, but which are unnecessary to its operability.

The temperature at which the catalytic oxidation is conducted may vary considerably depending upon the particular olefin being oxidized and the correlated conditions of the rate of throughput or contact time and the ratio of olefin to oxygen. In general, when operating at pressures near atmospheric, temperatures in the range of 200–500° C. may be advantageously employed. However, the process may be conducted at other pressures, and in the case where super atmospheric pressures are employed somewhat lower temperatures are feasible. In the case where this process is employed to convert propylene to acrolein, a temperature range of 200–400° C. is preferred when operating at slightly elevated pressures (i.e., 1.5 atmospheres).

The contact time is not critical and may be selected from a broad operable range which varies from 0.1 to 200 seconds. Contact time may be defined as the length of time in seconds which a unit volume of gas measured under the conditions of reaction is in contact with a unit volume of the catalyst. It may be calculated, for example, from the volume of catalyst bed, the average temperature and pressure of the reactor, and the flow rates of several components of the reaction mixture. The optimum contact time, of course, will vary depending upon the olefin being treated but in the case of propylene the preferred contact time is about 0.1 to 15 seconds.

A molar ratio of oxygen to olefin between about 5:1 to 0.05:1 generally gives the most satisfactory results. For the conversion of propylene to acrolein a preferred ratio of oxygen to olefin is about 0.5:1 to 2.5:1. Inert diluents, such as nitrogen, carbon dioxide and saturated hydrocarbons, such as methane, propane, butane and pentane, may be present in the reaction mixture.

In general, any apparatus of the type suitable for carrying out oxidation reactions in the vapor phase may be employed for the execution of the process. It may be operated continuously or intermittently and may be a fixed bed with a pelleted catalyst. For close control of the temperature, it is preferable to employ a reactor containing "a fluidized bed of catalyst." It has been determined that without such temperature control the oxidation will proceed to the formation of carbon dioxide and water at the expense of the desired product.

As stated above, pressures other than atmospheric may be employed in the process. The reaction proceeds well at mildly elevated pressures and the use of expensive high pressure equipment is not required.

The reactor may be brought to the reaction temperature before or after the introduction of the vapors to be reacted. In a large scale operation, it is preferable to carry out the process in a continuous manner and in this system the recirculation of unreacted olefin and/or oxygen is contemplated. Periodical regeneration or reaction of the catalyst is also contemplated.

The unsaturated carbonyl product or products may be isolated from the gases leaving the reaction zone by any appropriate means, the exact procedure in any given case being determined by the nature and quantity of the reaction products. For example, the excess gas may be scrubbed with cooled water or an appropriate solvent to remove the carbonyl product. In the case where the products are recovered in this manner, the ultimate recovery from the solvent may be by any suitable means such as distillation. The efficiency of the scrubbing operation may be improved when water is employed as the scrubbing agent by adding a suitable wetting agent to the water. If desired, the scrubbing of the reaction gases may be preceded by a cooled water quench of the gases which of itself will serve to separate a significant amount of the carbonyl products. Where molecular oxygen is employed as the oxidizing agent in the process, the resulting product mixture remaining after the removal of the carbonyl product may be treated to remove carbon dioxide with the remainder of the mixture comprising any unreacted olefin and oxygen being recycled through the reactor. If air is employed as the oxidizing agent in lieu of molecular oxygen, the residual product after separation of the carbonyl product may be scrubbed with a nonpolar solvent, e.g., a hydrocarbon fraction, in order to recover unreacted olefin. In this case the remaining gases may be discarded. An inhibitor to prevent polymerization of the unsaturated products, as is well known in the art, may be added at any stage.

placing a certain amount of the material in water and after a period of time determining the exact proportion of water absorption. Particles of the same material are then impregnated with only the specific amount of solution which they are potentially capable of absorbing. The volume of the impregnating solution may thus be adjusted to be just sufficient to completely wet the particles without excess solution.

After completion of the impregnation with copper chloride the impregnated silica gel particles were dried. Thereafter, 44 cc. of an aqueous solution of sodium borohydride (present in a 10% molar excess over stoichiometric requirements) was poured directly over the impregnated silica gel particles.

Conversion to the metal boride took place spontaneously with the evolution of hydrogen and the appearance of black color. After washing the thus treated silica gel particles with water until the effluent was neutral, the catalyst thus obtained was preliminarily dried with ethyl alcohol and then dried under vacuum in a closed system.

The resulting copper boride catalyst contained about 5% by weight of copper boride.

Example II

Following the procedure of Example I, four additional catalysts were prepared. These catalysts included copper boride deposited on a support of $Al_2O_3$, cobalt boride deposited on a support of $Al_2O_3$, cobalt boride deposited on a support of $SiO_2$ and nickel boride deposited on a support of $Al_2O_3$. In each instance, the percentage of metal boride present amounted to 5% by weight of the catalyst.

Example III

The metal boride catalysts prepared in Examples I and II were employed to effect the oxidation of propylene to acrolein in a fluid bed reactor under the following conditions:

Temperature _____° C.__ 200–400
Pressure _____atmospheres__ 1.5
Contact time (in secs. at 25° C.) _____ 0.5
$C_3^=/O_2$ _____ 6:1
Mol percent $O_2$ _____percent__ 6
Diluent (nitrogen) _____do____ 58

TABLE 1

| Metal Boride | Amount (percent by wt.) | Support | Temp.[1] (° C.) | Conversion $C_3$ (Mol percent) | Efficiency Acrolein (Mol percent) |
|---|---|---|---|---|---|
|  |  | $Al_2O_3$ | 300 | 0.5 | 0 |
|  |  | $SiO_2$ | 375 | 0.5 | 0 |
| Copper boride | 5 | $Al_2O_3$ | 300 | 6 |  |
| Do | 5 | $SiO_2$ | 215 | 24 | 46 |
| Cobalt boride | 5 | $Al_2O_3$ | 240 | 25 | 0 |
| Do | 5 | $SiO_2$ | 215 | 12 | 9 |
| Nickel boride | 5 | $Al_2O_3$ | 304 | 6 | 6 |

[1] The temperatures given in this column represent initiation temperatures. The figures for the conversion and efficiency columns were obtained at a constant temperature, viz, 350° C.

The invention is further clarified by reference to the following examples.

Example I

A supported copper boride catalyst was prepared according to the following procedure:

5.23 g. of $CuCl_2 \cdot 2H_2O$ was added as a 46 cc. aqueous solution to 46.6 g. of previously dried silica gel of approximately 100 mesh. The amount of impregnating solution was carefully controlled by a practice designated as the capacity absorption or "not excess" solution technique. According to this technique, a sample of material to be impregnated is tested with respect to the specific amount of liquid which can be absorbed by any unit of the material. This can be determined, for example, by It can be seen that the support materials, alumina and silica, have little if any catalytic activity.

More importantly, it can be seen that supported copper boride catalyst has significantly greater efficiency in the oxidation of propylene to acrolein than any of the other supported metal boride catalysts. Although a high conversion of propylene is effected with cobalt boride supported on alumina, essentially no acrolein was obtained using this catalyst.

Example IV

The runs set forth in Table 2 were made using a fluidized bed reaction system wherein catalyst in the size range of about 100 mesh was supported by a fritted glass plate inside a glass tube. The reaction stream was prepared by first blending nitrogen, oxygen and propylene, passing them through a preheater mixing zone and then into the reaction system. The exit gases from the reactor were sampled from time to time with a hypodermic syringe and injected into a gas chromatograph to determine conversion and efficiency levels at the particular reaction conditions.

TABLE 2

| Run | 1 | 2 | 3 | 4 | 5 |
|---|---|---|---|---|---|
| Catalysts, 5% by wt. on SiO$_2$ | (1) | (1) | (2) | (2) | (3) |
| Temperature, °C | 352 | 350 | 350 | 357 | 370 |
| Contact time, sec | 0.5 | 0.5 | 0.5 | 0.5 | 0.5 |
| Pressure, atm | 1.5 | 1.5 | 1.5 | 1.5 | 1.5 |
| Feed-mol, percent: | | | | | |
| Propylene | 80 | 36 | 80 | 36 | 36 |
| Oxygen | 20 | 6 | 20 | 6 | 6 |
| Nitrogen | 0 | 58 | 0 | 58 | 58 |
| Product distribution, percent of total: | | | | | |
| CO$_2$ | 57.0 | 63 | 50.0 | 44.5 | 65 |
| Acetaldehyde | 4.5 | 3.6 | 1.9 | 5.5 | 3.5 |
| Propionaldehyde | 0.0 | 0.0 | 2.7 | 2.0 | 2.0 |
| Acrolein | 37.5 | 27.2 | 44.5 | 45.5 | 29.0 |
| Dimer | 1.0 | 1.2 | 0.9 | 2.5 | 0.5 |
| Theoretical conversion, mol percent | 11.5 | 32 | 18.5 | 24 | 29 |
| Efficiency, total organic, mol percent | 43 | 32 | 50 | 55.5 | 35.5 |
| Efficiency, acrolein mol percent | 37.5 | 27.2 | 44.5 | 45.5 | 29 |

¹ Copper oxide. ² Copper boride.
³ Copper boride (containing 1% bismuth).

Runs 1 and 2 show the results obtained with a standard copper oxide catalyst prepared by the oxidative decomposition of cupric nitrate. By comparison of the first two runs with runs 3 and 4 it can be seen that the efficiency of the copper boride catalyst is vastly superior to the copper oxide catalyst. From run 5, it will be noted that the addition of 1% bismuth to the copper boride catalyst slightly increases its activity, but decreases the selectivity.

Obviously, many modifications and variations of the invention as hereinbefore set forth may be made without departing from the spirit and scope thereof, and therefore only such limitations should be imposed as are indicated in the appended claims.

What is claimed is:

1. A method for the catalytic oxidation of olefins which comprises contacting a gaseous mixture of olefin and oxygen at a temperature in the range of 200–500° C. with a catalyst comprising copper boride supported on a silica carrier.

2. The method of claim 1 wherein the olefin contains 3 to 8 carbon atoms.

3. The method of claim 1 wherein the copper boride catalyst contains a minor amount of an added promoter selected from the group consisting of bismuth, tungsten, chromium and molybdenum.

4. A process for the manufacture of acrolein which comprises contacting a gaseous mixture of propylene and oxygen at a temperature in the range of 200 to 500° C. with a catalyst comprising copper boride supported on a silica carrier.

5. A process for the manufacture of methacrolein which comprises contacting a gaseous mixture of isobutylene and oxygen at temperature in the range of 200 to 500° C. with a catalyst comprising copper boride supported on a silica carrier.

References Cited

UNITED STATES PATENTS 1,255,590  2/1918  Ellis _____ 252—432

LEON ZITVER, *Primary Examiner.*

R. H. LILES, *Assistant Examiner.*